US008943020B2

(12) United States Patent
Avrahami

(10) Patent No.: US 8,943,020 B2
(45) Date of Patent: Jan. 27, 2015

(54) TECHNIQUES FOR INTELLIGENT MEDIA SHOW ACROSS MULTIPLE DEVICES

(75) Inventor: Daniel Avrahami, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 221 days.

(21) Appl. No.: 13/435,697

(22) Filed: Mar. 30, 2012

(65) Prior Publication Data

US 2013/0262536 A1    Oct. 3, 2013

(51) Int. Cl.
| | | |
|---|---|---|
| *G06F 7/00* | (2006.01) | |
| *G06F 17/30* | (2006.01) | |
| *G11B 27/10* | (2006.01) | |
| *G11B 27/32* | (2006.01) | |
| *H04N 21/43* | (2011.01) | |
| *H04N 21/45* | (2011.01) | |
| *H04N 21/4728* | (2011.01) | |
| *H04N 21/41* | (2011.01) | |
| *H04N 21/436* | (2011.01) | |

(52) U.S. Cl.
CPC .... *G06F 17/30194* (2013.01); *G06F 17/30056* (2013.01); *G11B 27/105* (2013.01); *G11B 27/322* (2013.01); *H04N 21/4307* (2013.01); *H04N 21/4516* (2013.01); *H04N 21/4728* (2013.01); *H04N 21/4122* (2013.01); *H04N 21/436* (2013.01)
USPC ......................................... 707/610; 707/827

(58) Field of Classification Search
CPC ................................................ G06F 17/30056

USPC ........... 707/743, 758, 805, 827; 715/738, 201
See application file for complete search history.

(56) References Cited

U.S. PATENT DOCUMENTS

| | | | | |
|---|---|---|---|---|
| 5,446,490 | A * | 8/1995 | Blahut et al. ..................... 725/97 |
| 7,276,651 | B1 * | 10/2007 | Wolf ........................... 800/320.1 |
| 8,190,680 | B2 * | 5/2012 | Spilo et al. ..................... 709/204 |
| 8,315,423 | B1 * | 11/2012 | Jing et al. ....................... 382/100 |
| 8,451,832 | B2 * | 5/2013 | Takai et al. .................... 370/389 |
| 2005/0217461 | A1 * | 10/2005 | Wang ............................... 84/608 |
| 2008/0062383 | A1 * | 3/2008 | Endrikhovski et al. ........ 351/209 |
| 2009/0113278 | A1 * | 4/2009 | Denoue et al. ................ 715/201 |
| 2010/0042682 | A1 * | 2/2010 | Kaye ............................... 709/203 |
| 2010/0318520 | A1 * | 12/2010 | Loeb et al. .................... 707/743 |
| 2011/0018889 | A1 * | 1/2011 | Dalal et al. .................... 345/581 |
| 2011/0060998 | A1 * | 3/2011 | Schwartz et al. ............. 715/738 |
| 2012/0144435 | A1 * | 6/2012 | Spilo et al. ....................... 725/78 |

FOREIGN PATENT DOCUMENTS

EP        2073193    *    6/2009    ............... G10H 1/00

* cited by examiner

*Primary Examiner* — Hung T Vy
(74) *Attorney, Agent, or Firm* — Kacvinsky Daisak Bluni PLLC

(57) ABSTRACT

An apparatus may include a processor circuit and a media management module operative on the processor circuit to identify meta-data from one or more of a plurality of media files, and to allocate, based on the meta-data, one or more media files for a first media presentation on a first device and one or more different media files for a second media presentation on a second device different than the first device, at least a portion of the first and second media presentations to occur concurrently. Other embodiments are described and claimed.

28 Claims, 14 Drawing Sheets

*Media Show Processing System*
*100*

Media Show Processing System
100

TECHNIQUES FOR INTELLIGENT MEDIA SHOW ACROSS MULTIPLE DEVICES

BACKGROUND

Although the volume of stored digital photo and video content is rapidly increasing, the viewing experience for photographs and videos typically involves a serial presentation, in which a user may select individual images or videos for viewing. In one example, the user may select a group of images for presentation in a so-called "slide show" format, which may automatically present multiple images for display on a display device.

In some instances, the slide show may automatically scroll through a set of photographs in a predetermined sequence at a user-defined rate or at a default rate. Such a process, while somewhat reminiscent of perusing a physical photograph album, does not harness many of the features afforded by digital media, digital devices, and devices for communicating digital media that may enhance the experience of presenting such digital media.

Accordingly, there may be a need for improved techniques and apparatus to solve these and other problems.

DETAILED DESCRIPTION

Various embodiments are directed to enhancing the user experience of digital media, such as media containing still images and/or video images. In particular the present embodiments provide novel techniques and systems for creating immersive media experiences, in which visual content may be presented to the user or users on multiple devices during the same period of time. In particular, the present embodiments take advantage of the computing power available in commonly used devices such as desktop computers and laptop computers, for example, and the presence of other devices that include displays and are typically found in proximity to such a computer within a home or other setting. Specifically, the present embodiments provide novel solutions for creating a media show, which may comprise multiple presentations arranged in slide show or similar format, in which the multiple different presentations are provided across respective multiple different displays.

In various embodiments, a media show is intelligently orchestrated by taking into account meta-data associated with a media file and/or the properties of multiple displays to present multiple different media files that constitute the media show. As an example, a laptop or other device may orchestrate a media show to be presented on multiple heterogeneous devices, such as a television, tablet computer, smartphone, or other laptop. The orchestrating laptop device may, for example, match a particular media file or portion of a file for presentation on a target display device based upon the properties of the media file and target display device. Thus, for example, a media file presenting a scenery view may be allocated to a large display device while a media file presenting close up images of persons may be presented on a smaller device, thereby providing a richer visual experience.

The present embodiments thereby provide advantages with respect to known techniques for presenting slide shows, which, at best, may provide slideshows across multiple connected monitors or other devices in which the same content is displayed on all devices. Moreover, as detailed below, the present embodiments provide techniques to employ the content of visual media or a soundtrack to automatically and intelligently select target displays for delivery of media files as wells as timing of presentation of the media files on the target displays.

Figure 1:
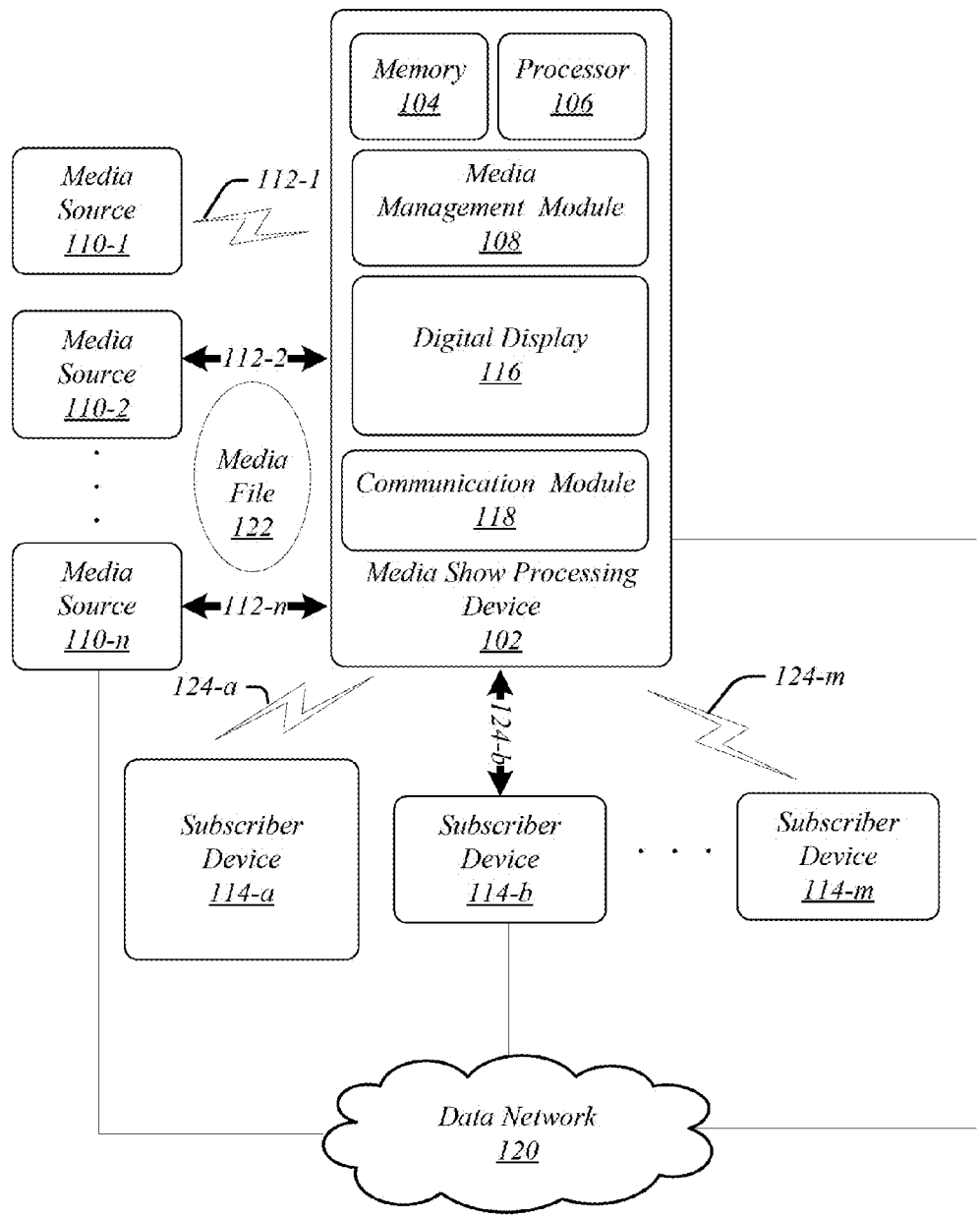
FIG. 1 illustrates a block diagram for an exemplary system.

FIG. 1 illustrates a block diagram for a media show processing system 100. The media show processing system 100 is generally directed to performing media processing operations for media content in accordance with any associated control signaling necessary for presenting media content on an output device, which output device may include the media show processing device 102 and various subscriber devices 114-a, 114-b, to 114-m, where a, b, and m represent any positive integer and may each represent the same or different integer. In one embodiment, the media show processing system 100 is particularly arranged to provide digital media content, such as media files that, when executed, produce still images and/or video. The media show processing system 100 may load media content received from disparate media sources to a media show processing device in order to provide the media to viewers in a home environment, such as on multiple display devices within a room. However, the media show processing system 100 may be suitable for any use scenarios involving presentation and display of media content, including media shows in outdoor settings and in public settings, such as concert halls, nightclubs, and other venues. Although the media show processing system 100 shown in FIG. 1 has a limited number of elements in a certain topology, it may be appreciated that the media show processing system 100 may include more or fewer elements in alternate topologies as desired for a given implementation. The embodiments are not limited in this context.

In various embodiments, media show processing system 100 may be implemented as a wired communication system, a wireless communication system, or a combination of both. Although media show processing system 100 may be illustrated using a particular communications media by way of example, it may be appreciated that the principles and techniques discussed herein may be implemented using any type of communication media and accompanying technology. The embodiments are not limited in this context.

When implemented as a wired system, for example, the media show processing system 100 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, the media show processing system 100 may include one or more wireless elements arranged to communicate information over one or more types of wireless communication media. An example of wireless communication media may include portions of a wireless spectrum, such as the RF spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

In the illustrated embodiment shown in FIG. 1, the media show processing system 100 may comprise a media show processing device 102. The media show processing device 102 may be linked via links 112-1 to 112-n, which may be wired or wireless links, to various media sources 110-1 to 110-n that provide media files to be used in a media show, where n represents any positive integer. The media show processing device 102, may, for example, be wirelessly linked to a media source 110-1, and may be liked via a wired connection to media sources 110-2 to 110-n.

In some embodiments in which the media show processing device 102 is a desktop or laptop computer, the various media sources 110-1-110-n may be linked to the media show processing device in a temporary fashion for downloading media files. Thus, a media source may be a digital camera, digital video device, smartphone, tablet computing device, computer, or other device that contains one or more media files 122 that a user or users may wish to upload to the media show processing device 102. Other examples of media sources 110-1 to 110-n include any hardware or software element capable of storing and/or delivering media information, such as a digital video recorder (DVR), a personal video recorder (PVR), a digital versatile disc (DVD) device, a video home system (VHS) device, a digital VHS device, a disk drive, a hard drive, an optical disc drive a universal serial bus (USB) flash drive, a memory card, a secure digital (SD) memory card, a mass storage device, a flash drive, a computer, a gaming console, a compact disc (CD) player, computer-readable or machine-readable memory, video surveillance system, teleconferencing system, telephone system, wearable computers, portable media players (PMP), portable media recorders (PMR), digital audio devices (e.g., MP3 players), digital media servers and so forth. The embodiments are not limited in this context. In cases where a media source 110 is not initially linked to the media show processing device, the user may manually couple a media source 110 via the appropriate wireless or wired connection when a media file is to be uploaded. Subsequently, the media source 110 may be decoupled or remain coupled to the media show processing device 102 as desired.

In some embodiments, a media source 110 may be a remote media source, such as a computer server in a data network 120, such as the Internet. In various embodiments, a user may select a media file from such a remote source for transfer to the media show processing device 102. In further embodiments, as described below, one or more subscriber devices 114-a to 114-m, may be linked to the media show processing device over links 124-a, 124-b, to 124-m. The subscriber devices and media show processing device may additionally be linked to a data network 120.

As illustrated in FIG. 1, the media show processing device 102 may include a memory 104, processor 106, media management module 108, and communication module 118, whose operation is detailed below. In particular, the media show processing device 102 may execute processing operations or logic for the media show processing system 100 using the processor 106. The processor 106 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The media show processing device 102 may execute communications operations or logic for the media show processing system 100 using communication module 118. The communication module 118 may receive and/or send media content and may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communication module 118 may include various types of standard communication elements, such as one or more communications interfaces, network interfaces, network interface cards (NIC), radios, wireless transmitters/receivers (transceivers), wired and/or wireless communication media, infra-red transceivers, serial interfaces, parallel interfaces, bus interfaces, physical connectors, and so forth. By way of example, and not limitation, communication module 118 may include wired communications media and wireless communications media.

The media show processing device 102 may further include a digital display 116, which may be employed to view media files 122, including during a media show. Examples of a digital display include a liquid crystal display (LCD), light emitting diode display (LED), touch sensitive display, plasma display, cathode ray tube, and other display types.

In various embodiments, the media show processing device 102 may include various input devices (not shown) including, but not limited to, keyboards, microphones, mouse, joystick or other navigation devices, and so forth. The user may use such input devices to select media files from one or more media sources 110-1 to 110-n for preparation of a media show. Consistent with the present embodiments, the media show may involve display of visual content from media files 122 in multiple different devices that each includes a display. As an example, each of subscriber devices 114-a to 114-m may include a digital display (not separately shown) for displaying still images or video content. In addition, subscriber devices 114-a to 114-m may include without limitation, audio speakers, headphones, lighting components, and other devices for operation during a media show.

As detailed below, the media show processing device 102 may organize multiple media files for presentation in a media show. In addition to media files received from an external source, the media show processing device 102 may use media files that may be already stored in an internal memory of the media show processing device 102. In various embodiments, the media management module 108 of media show processing device 102 may organize multiple media files and analyze content of the media files, as well as the properties of subscriber devices 114 in order to create a media show. As used hereinafter, the term "media file" refers generally to a digital file that contains data for presentation as visual content, such as still image(s) and/or video images. A media file may further include data for output as audio signals, as well as metadata, as detailed below. The media files may in general be provided in any convenient format, including various known commercial formats.

In various embodiments, the media show processing system 100 may orchestrate a media show that includes multiple media presentations on multiple devices in which at least two different display devices present different visual content. In this manner, a user or users can perceive multiple different images or different video content at the same time, where one set of images/video content is generated by a first display device and a second, possibly different, set of images/video content is generated by a second display device. The term "media presentation" is used herein to refer to the execution of a media file or files on a specific display device, such as a subscriber device 114-a to 114-m. Thus, as used herein, the term "media show" refers to the running of multiple media presentations, which are generally concurrent, where each media presentation involves a specific combination of a set of media content, such as a set of media files, together with a display device for playing that set of media content. Examples of a media show include the concurrent presentation of two different slideshows on two respective display devices, where each slideshow comprises multiple photographs; concurrent presentation of a home video on a first display and a slideshow of photographs on a second display; concurrent presentation of movie content or a television show on a first display; and a slideshow of photographs on a second display, and so forth. In addition, a given media presentation shown on a single display may include multiple different types of media, such as a slideshow of photographs followed by a video presentation.

In different embodiments, the media show processing device 102 may download multiple media files 122 or may contain a set of pre-stored media files for organizing a media show. The media show processing device may subsequently link to one or more subscriber devices using the links 124-a to 124-n, which may be wired or wireless links. In one example, to initiate a media show, the media show processing device 102 may link to subscriber device 114-a and then direct the subscriber device 114-a to generate a first media presentation that consists of a slide show that plays multiple media files, where each media file when executed presents a still image in which the still images are to be presented in a desired sequence. The media show processing device 102 may provide further input to direct the timing of the first media presentation including, for example, the instance when the subscriber device is to first generate one or more images and the duration for presentation of that image(s). At the same time, the media show processing device 102 may generate a second media presentation comprising a video file. Consistent with various embodiments, at least a portion of the duration of the first media presentation may overlap in time with the second media presentation. The displays of the media show processing device 102 and subscriber device 114-a may be oriented in such as fashion that a user may simultaneously view images from both displays, thereby providing an enriched visual environment.

Figure 2:
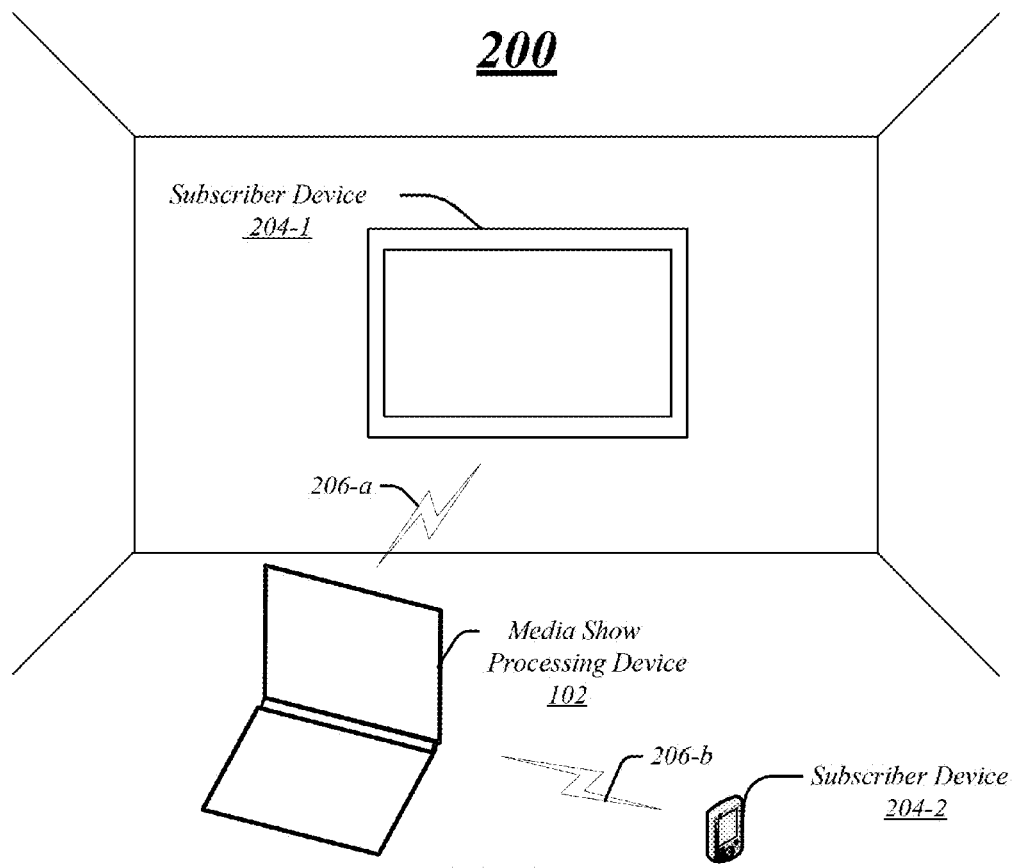
FIG. 2 depicts an embodiment of a system.

FIG. 2 depicts an embodiment of a media show processing system 200 that may typically be used in a home or other indoor environment, for example. In the example illustrated, the media show processing device 102 may be laptop computer that a user deploys in proximity to a subscriber device 204-1. The subscriber device 204-1 may be a large display device, such as a large monitor or television. A user may deploy media show processing device 102 to arrange media files to be concurrently played in a media show on multiple devices, such as the subscriber device 204-1, media show processing device 102, and other devices that may be located in proximity to the subscriber device 204-1, such as subscriber device 204-2. As a part of the media show to be presented, the media show processing device 102 may, for example, communicate over link 206-a and direct the appropriate media file for presentation on subscriber device 204-1 based upon properties of the subscriber device 204-1, as well as properties of the media file to be executed on subscriber device 204-1. For example, as noted above, it may be appropriate to present panoramic type images on the subscriber device 204-1, while more intimate images are sent over link 206-b to be presented on a device having a smaller display, such as subscriber device 204-2 and may additionally or alternatively be presented on media show processing device 102.

Accordingly, to organize and orchestrate a media show, the media show processing device 102 may employ various procedures to determine the content of media files to be played the media show, the size and capabilities of subscriber devices to play the various media presentations that constitute the media show, and other information. In some embodiments, the properties of a subscriber device may be determined at the time when the media show processing device links to the subscriber device in question. For media show processing device 102 may employ a local wireless communications technology such as Bluetooth® or Intel® Wireless Display (WiDi) to communicate with one or more subscriber devices. The media show processing device 102 may thereby link to the subscriber device by a pairing process, which process is triggered either by a specific request from a user to create a bond (for example, the user explicitly requests to "Add a Bluetooth device"), or may be triggered automatically when connecting to a device where (for the first time) the identity of a device is required for security purposes. Consistent with some embodiments, display and other device information of a subscriber device may be provided to the media show processing device 102 during a pairing process. In other embodiments, such subscriber device information may be pre-stored in a memory 104 of the media show processing device 102.

Consistent with various embodiments, a user may employ the media show processing device 102 to select an initial set of devices to present visual content in a media show, in which multiple different media presentations are orchestrated over multiple different devices. Once the media show processing device 102 is communicatively coupled to the desired devices, the user may initiate a media show in which the media management module 108 manages distribution of media files for execution on the various devices. In so doing, the media management module 108 may take into account the properties of the selected initial set of devices, as well as the properties/content of the media files, as previously noted and further detailed in the discussion to follow.

Figure 3:
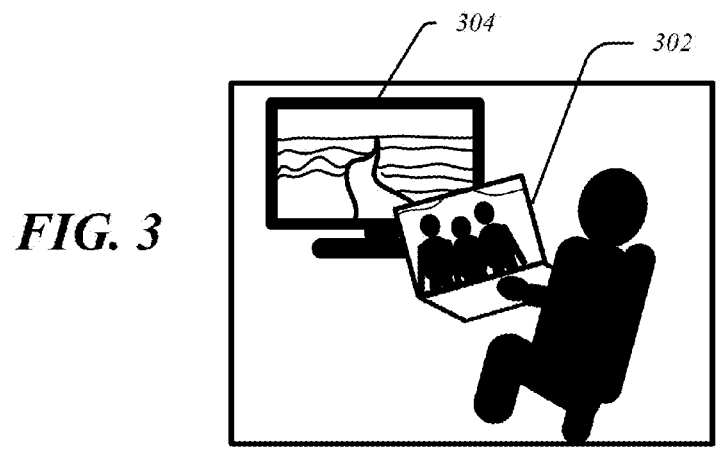
FIG. 3 depicts one use scenario of a system, consistent with various embodiments.

FIG. 3 depicts one use scenario of a media show processing system 300, consistent with various embodiments. In FIG. 3, a rich private slideshow experience is illustrated. For example, the user (parent) shown in FIG. 3 may have returned with a spouse from a wonderful family vacation at the Grand Canyon, after which their 21 year-old daughter and 18 year-old son are back in college. The parent may upload vacation photographs and videos to her laptop and may wish to relive the great time she experienced with the kids again. She may therefore initiate a media show to view the photographs and/or videos using a laptop computer, which may act as a media show processing device 302. The user may select a folder located in memory on the laptop computer, in which the vacation photos and videos have been previously stored after downloading from the appropriate device, such as a digital camera. The media show processing device 302 may also wirelessly connect to the widescreen television 304 to be used to display visual content from the vacation. In one scenario, the user then may indicate to the media show processing device 302 that it can display media (in the form of the photographs and/or video) on the television 304 as wells as on the media show processing device 302 (laptop computer) itself, and may subsequently click 'Play'. Photographs and videos may then be distributed from a memory (not shown) in the media show processing device 302 and begin to play on both the media show processing device 302 and television 304.

Having identified the television 304 as a large screen device, the media show processing device 302 may decide to use the television 304 to display "background" photographs, which may correspond primarily to scenery photographs. Such scenery photographs may be identified, for example, using computer vision algorithms and meta-data embedded in a media file as detailed below. Accordingly, the appropriate scenery photograph(s) may be forwarded to the television and may be changed less frequently during the media show. A media management module running on the media show processing device 302 may determine that more personal photographs, such as photographs of the family, are to be displayed on the media show processing device 302, so that files that generate photographs of the family are forwarded for display on the media show processing device 302. In addition, the photographs presenting more content involving people may be displayed for a longer duration during the media show, allowing parents who view the media show to experience the time with spent with their children on the vacation once again.

Figure 4:
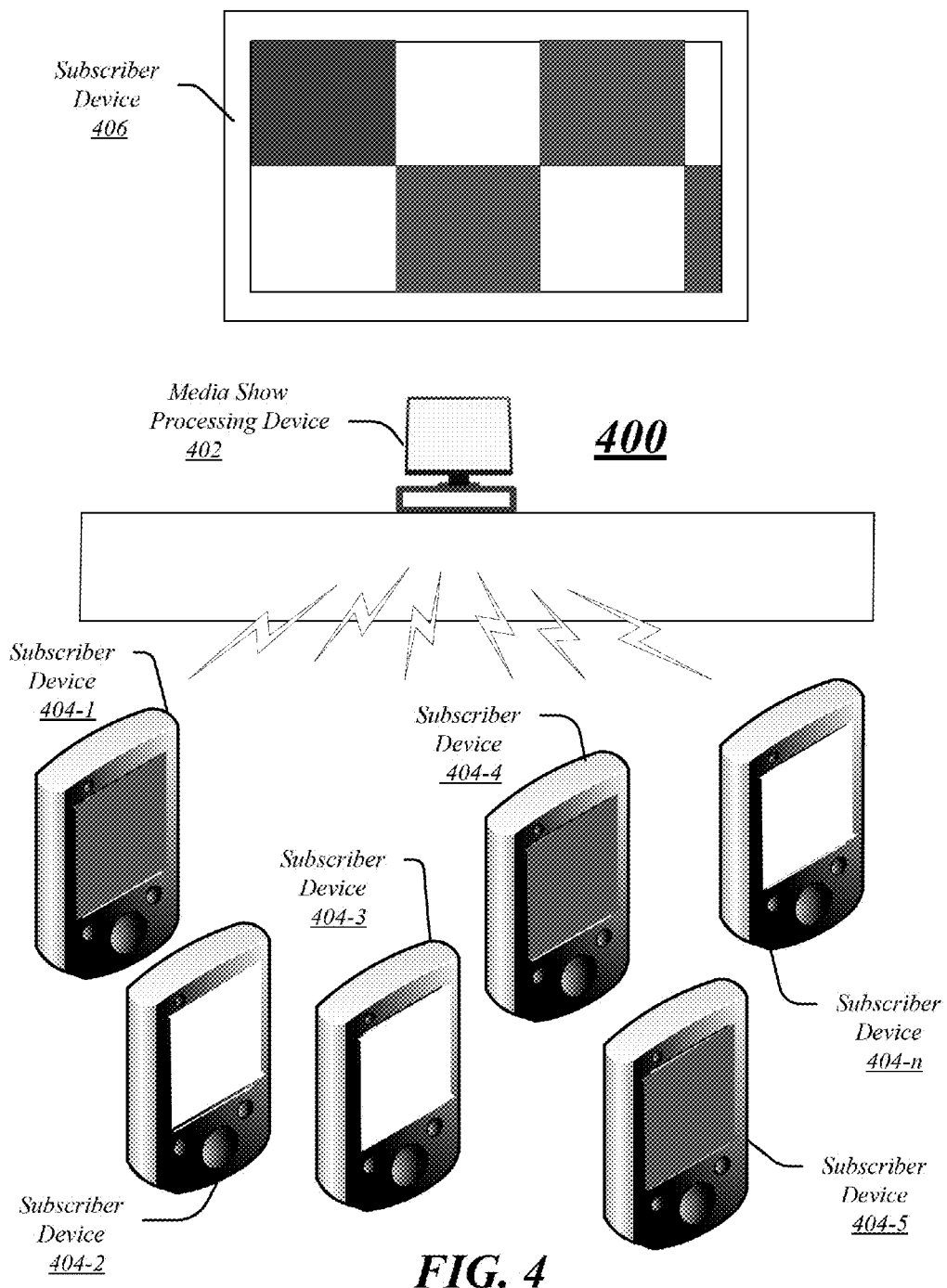
FIG. 4 depicts another use scenario of a system, consistent with further embodiments.

FIG. 4 depicts another use scenario of a media show processing system 400, consistent with further embodiments. In this scenario, a group of users may collectively participate in a media show by subscribing to a device that orchestrates the media show. For example, the scenario of FIG. 4 may depict a public event in which two or more friends attend an indoor or outdoor show to hear their favorite musical band. As in many other shows, images and video clips may be displayed on one or more large screens on a show stage, generally depicted as subscriber device 406-1. But instead of being limited to displays on the stage, the media show provided by the band may employ a technology that allows images and videos to be sent to devices such as smartphones of audience members, creating a sea of color and imagery. In particular, the media show is orchestrated by a media show processing device 402 that employs a wireless communications technology that permits multiple users to independently subscribe to a media show. The group of friends, as well as many other audience members may subscribe their smartphones, depicted as subscriber devices 401-1 to 404-n, to the band's digital data feed provided by the media show processing device 402. As the show proceeds, the audience members' smartphones show images that are synchronized with the music and associated with the videos or other visual content displayed on the giant stage screen(s). The media show processing device 402 may determine properties associated with the subscribing devices 404-1 to 404-n in order to determine content of still images or video to be provided to each subscribing device.

In the example illustrated, a pattern of different colors is provided to the large screen device, subscriber device 406. The smartphone devices, that is, subscribing devices 404-1 to 404-n, on the other hand, are presented with different visual content, such as a solid pattern, which may be a solid color selected from one of the colors presented on the large screen of subscriber device 406. Additionally, as illustrated in FIG. 4, the media show processing device 402 may determine to send different colors to different subscriber devices of the subscriber devices 404-1 to 404-n, in order to provide a pattern of colors when multiple subscriber devices receive the media show simultaneously. The audience members may thereby enjoy comparing images that each receives on their phone. They wave their phones as they dance and the club is painted with the changing colors of the photos on the smartphones' screens.

Figure 5A:
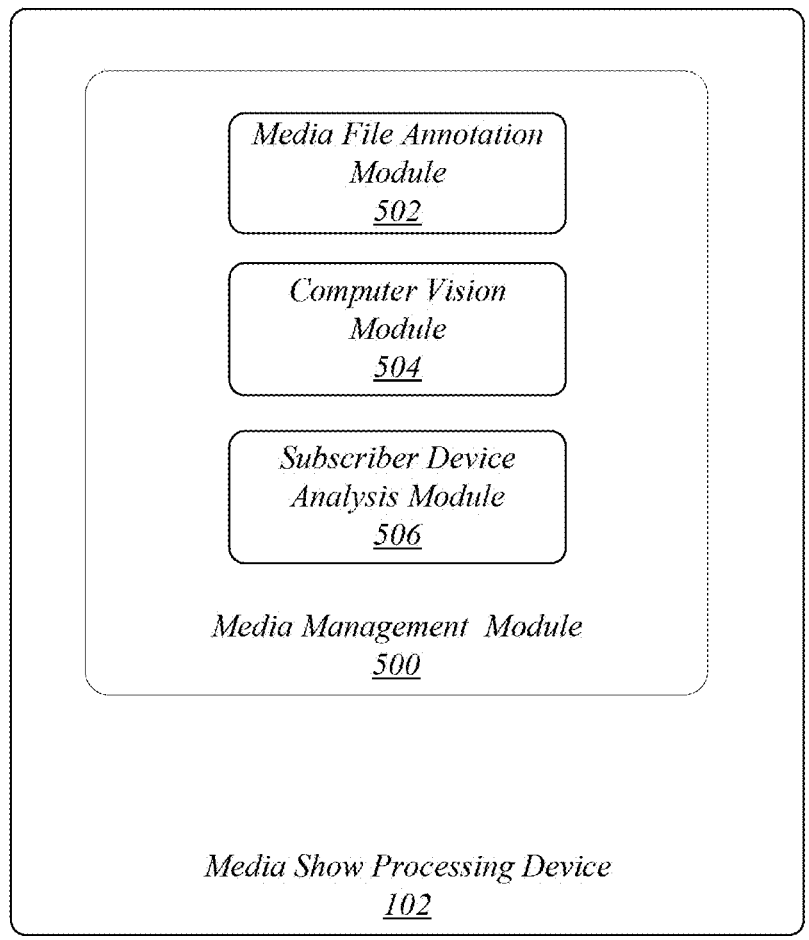
FIG. 5a illustrates one embodiment of a module.

In order for the media show processing device 102 to intelligently orchestrate a media show, the media management module 108 may gather various sources of data to create, modify, and schedule media files for presentation as part of a media show. FIG. 5a illustrates one embodiment of a media management module 500. The media management module 500 includes a media file annotation module 502, whose operation is detailed below. Generally, the media file annotation module 502 may process one or more media files to annotate the media file as needed with information that may be used by the media management module 500 to schedule the media file in a media show. The media management module 500 may further include a computer vision module 504 to assist in determining the properties of a media file by performing computer vision analysis, as detailed below. This analysis may be used by the media management module, including by the media file annotation module 502 to create further information concerning a given file, which may further assist in use of the media file in a media show. In addition, as depicted in FIG. 5a, the media management module 500 may contain a subscriber device analysis module 506 that operates to analyze one or more devices that subscribe to a media show processing device. As described in the discussion to follow, such information may be employed by a media management module to ascertain before or during a media show the properties of the subscribing device in order to better allocate media files to the subscriber device.

Figure 5B:
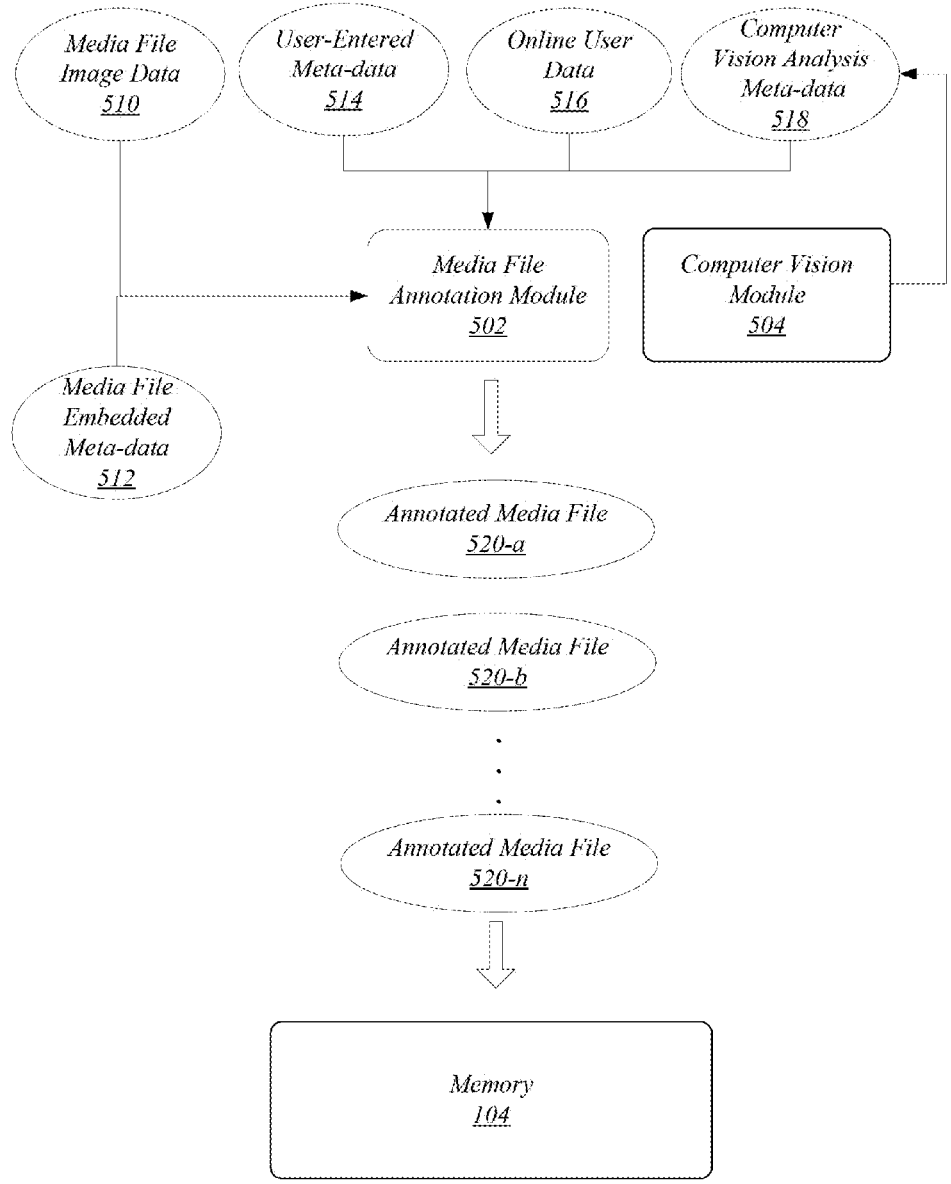
FIG. 5b depicts details of operation of a module in accordance with various embodiments.

FIG. 5b depicts details of operation of a media file annotation module 502 in accordance with various embodiments. As illustrated, the media file annotation module 502 may receive one or more data sources 510-518, from which one or more annotated media files 520-a to 520-n may be created. For example, a media file that includes visual content, such as a video or picture file may be input to the media file annotation module 502. In particular, the media file image data 510 may be processed by media file annotation module 502 together with one or more data sources to produce an annotated media file 520-a to 520-n. In many cases, media file embedded meta-data 512 may already be included in a received media file and may be therefore be processed by the media file annotation module 502 together with the media file image data 510. Such media file embedded meta-data 512 may be created automatically by a device generating the media file, such as a camera. Information in the media file embedded meta-data 512 may include, for example, date/time information indicating when a photograph was taken, the type of camera, and camera settings, the location, the type of lens used, zoom level, and depth information (if a depth or stereoscopic camera is used).

The media file annotation module 108 may also process user-entered meta-data 514, which may include specific entries associated with a given media file, such as a description of the content of the media file that may assist the media file annotation module 502 in scheduling the particular media file for presentation in one or more devices in a media show. For example, a user may enter a description of a photograph that indicates the place where a photograph is taken or names of key persons shown in a photograph.

In addition the media file annotation module 502 may process on-line user data 516 related to a given media file. For example, media file(s) to be presented in a media show may be a video or a set of photographs that can be publically accessed via a data network, such as the Internet. The media files may be presented to the public such that on-line ratings and/or commentary can be applied to a media file based on the user's opinion of the media file. This information may be stored and downloaded for processing by the media file annotation module together with its associated media file. Such information may be used, for instance, to determine whether and/or how a given media file is to be allocated in a media presentation.

The media file annotation module 502 may also receive and process computer vision analysis meta-data 518 that may be generated, for example, by the computer vision module 504 as described below. This meta-data may include information resulting from computer vision analysis of content generated by a given media data file when it is executed. In some embodiments, the computer vision module 504 may employ known computer vision techniques to analyze the media data file and thereby detect items such as people, faces, animals, or other objects that may be present in an image or video. Detection of regions of interest (ROI) within an image may also be carried out by the computer vision module 504. Among other information, the detected objects and/or ROIs may be output to media file annotation module 502 as computer vision analysis meta-data 518. For each media file processed by the media file annotation module 502, the media file image data and one or more of data sources 512-518 may be output as an annotated media file 520-n, and may be stored in a memory 104 as needed.

Figure 6:
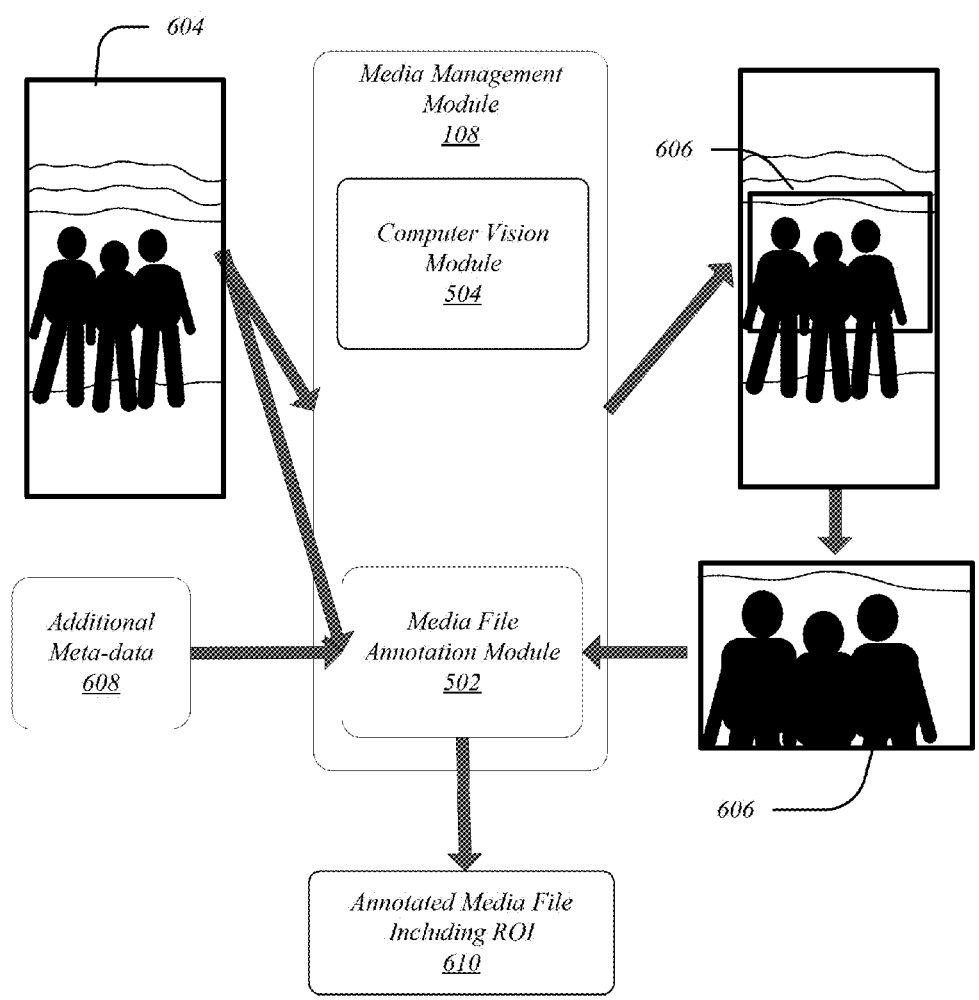
FIG. 6 depicts details of processing a media file consistent with further embodiments.

FIG. 6 depicts details of processing a media file consistent with further embodiments. In the illustration, a media file 604 is received and processed by the media management module 108. Execution of the image data of the media file 604 produces a photograph of three people against a scenery background as illustrated. The media file 604 may be processed by computer vision module 504, which uses computer vision techniques that identify a region of interest 606. The identified ROI 606 represents an image that forms a smaller portion of the image generated by the original media file 604, and is occupied in large part by the three people in the original image. The identified ROI 606 may be forwarded to the media file annotation module 502 together with any additional meta-data 608 that is associated with the media file 604. The media file annotation module 502 may combine the media file 604, ROI 606, and additional meta-data 608 to generate an annotated media file 610, which includes one or more items of annotation that may be used to allocate the media file 604 or portions of the media file for presentation in a subsequent media show.

Figure 7:
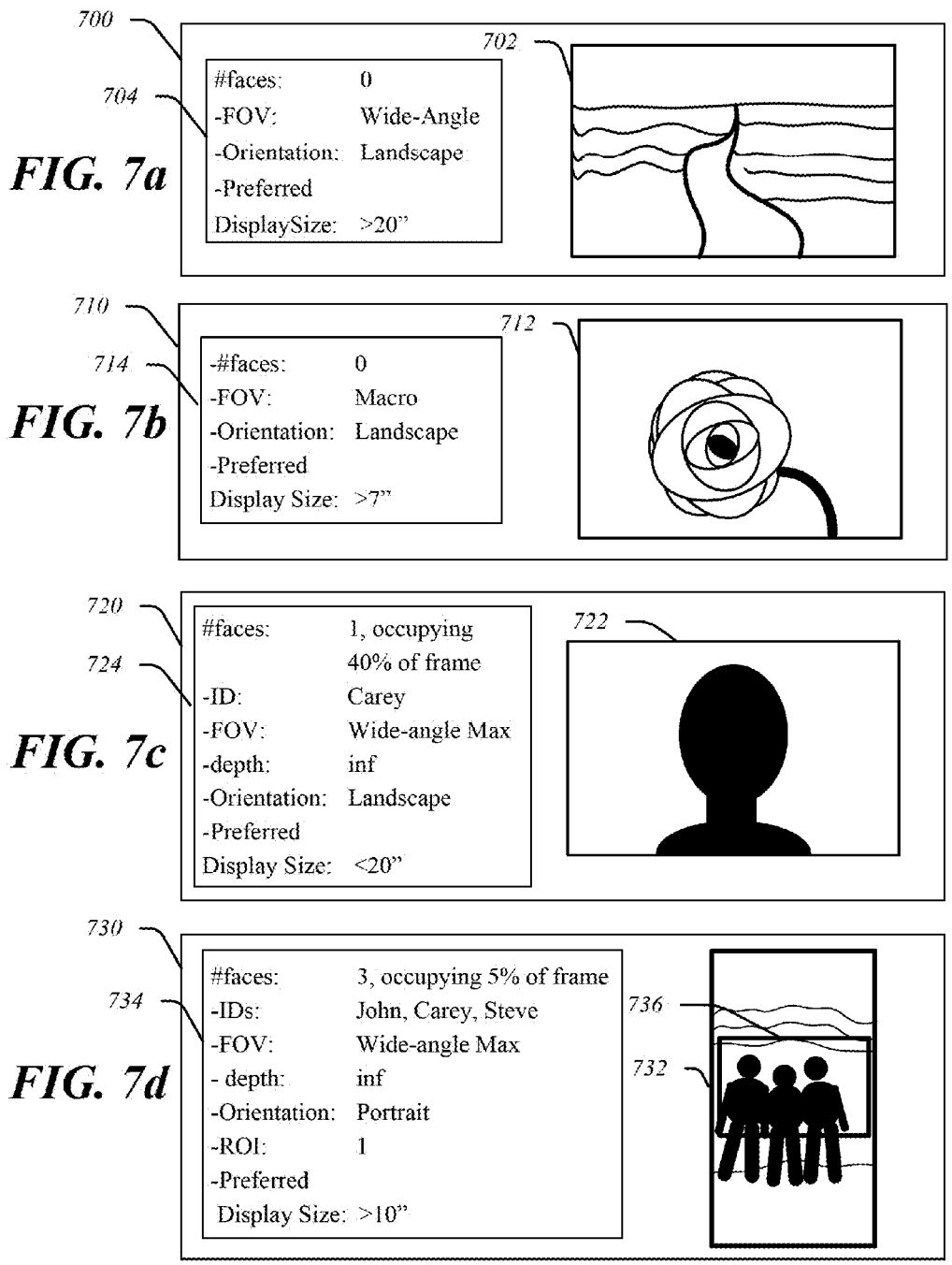
FIGS. 7a-7d depict exemplary files consistent with further embodiments.

FIGS. 7a-7d depict exemplary annotated media files consistent with further embodiments. In FIG. 7a there is shown a media file 700 that includes image 702 and annotation data 704. The image depicts a scenery view, while the associated annotation data 704 contains several items of information related to the image 702. The items of information may include meta-data created at the time of taking the photograph from which image 702 is generated. For example, the entry in the #faces field indicates no faces are present, the entry in a field-of-view (FOV) field indicates that the image is a wide angle image, the entry in the orientation field indicates a Landscape orientation, and the entry in the preferred display size field indicates a screen size greater than twenty inches. This meta-data may be employed to determine how to schedule the image 702 of the media file 700 for presentation in a media show. For example, during a media show in which the image 702 is scheduled for display, the image 702 may be allocated to one or more display devices that have display screens larger than twenty inches, if available.

In FIG. 7b, there is shown a media file 710 that includes image 712 and annotation data 714. The image depicts a macro view, while the associated annotation data 714 contains items of information that include meta-data created at the time of taking the photograph from which image 712 is generated. For example, the entry in the #faces field indicates no faces are present, the entry in the FOV field indicates that the image is a macro image, the entry in the orientation field indicates a Landscape orientation, and the entry in the preferred display size field indicates a screen size greater than only seven inches. In this case, during a media show in which the image 712 is to be displayed, a media management module may use the annotation data 714 to determine that it is appropriate for the image 712 to be allocated to one or more display devices that have display screens larger than seven inches, if available.

In FIG. 7c, there is shown a media file 720 that includes image 722 and annotation data 724. The image depicts a close-up view, while the associated annotation data 724 contains items of information that include meta-data created at the time of taking the photograph from which image 722 is generated. For example, the entry in the #faces field indicates one face is present, and that the face occupies approximately 40% of the screen. The entry in an ID field indicates the name of the person whose face is present in the image 722, a FOV field indicates that the image is a wide angle max image, the entry in the depth field indicates infinity, the entry in the orientation field indicates a Landscape orientation, and the entry in the preferred display size field indicates a screen size less than twenty inches. In this case, during a media show in which the image 722 is scheduled for display, a media management module may use the annotation data 724 to determine that it is appropriate for the image 722 to be allocated to one or more display devices that have display screens smaller than twenty inches, if available.

In FIG. 7d, there is shown a media file 730 that includes image 732 and annotation data 734. The image 732 depicts a view of people against a scenic background, while the associated annotation data 734 contains items of information that include meta-data created at the time of taking the photograph from which image 732 is generated. For example, the entry in the #faces field indicates three faces are present, and that the faces occupy approximately 5% of the screen. The entry in an ID field indicates the names of the persons whose faces are present in the image 732, a FOV field indicates that the image is a wide angle max image, the entry in the depth field indicates infinity, the entry in the orientation field indicates a portrait orientation, the entry in an ROI field indicates an ROI 1 736, and the entry in the preferred display size field indicates a screen size greater than ten inches. In this case, during a media show in which the image 732 is scheduled for display, a media management module may use the annotation data 734 to determine that it is appropriate for the image 732 to be allocated to one or more display devices that have display screens greater than ten inches, if available. In addition, a media management module may use the ROI 1 736, which is a close-up portion of the image 732 that focuses on the three persons, to generate a separate image in a media show, which may include only the ROI 1 736, for example.

Figure 8:
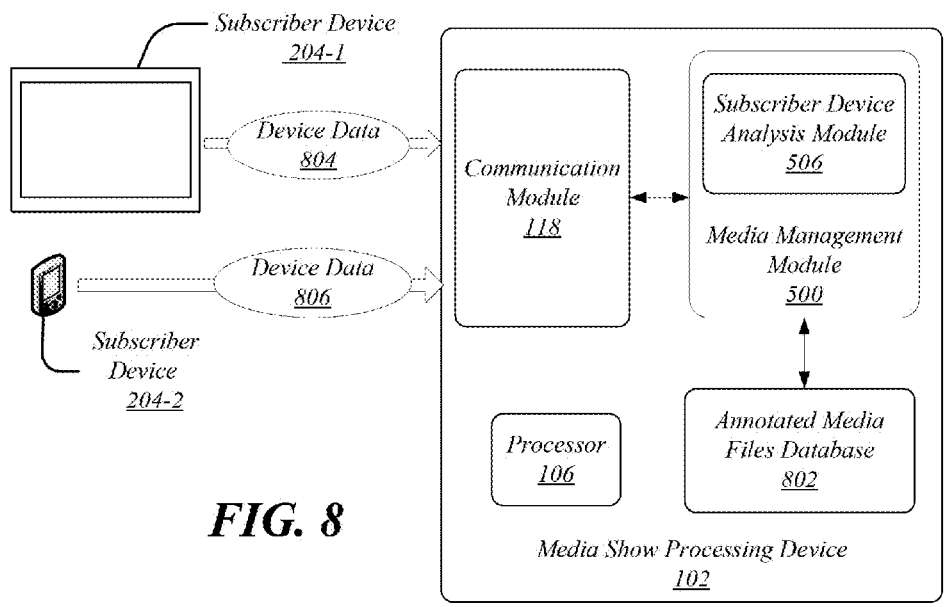
FIG. 8 depicts a use scenario consistent with the present embodiments.

FIG. 8 depicts communication of subscriber device information according to some embodiments. In FIG. 8, a scenario is shown in which two subscriber devices communicate information to a media show processing device 102 that is to manage the media show. In one example, the subscriber devices 204-1, 204-2 may be part of a wireless network that includes the media show processing device 102. When each of the subscriber devices 204-1, 204-2 wirelessly links to the media show processing device 102, respective device data 804, 806 related to device properties of the respective subscriber device may be communicated to the media show processing device 102, as illustrated in FIG. 8. This device data may, but need not, be stored in the media show processing device 102. If the device data 804, 806 is already stored in the media show processing device 102, each time a communications link between the subscriber devices 204-1 or 204-2 and the media show processing device 102 is established, a media management module 500 may determine that the properties of the subscriber device in question are known, and the device data 804, 806 need not be re-communicated to or re-stored in the media show processing device 102.

Examples of device properties of subscriber devices that may be communicated to the media show processing device 102 include display size of the subscriber device, capability to output sound, capability to display stereo images, and so forth.

In other embodiments, device data related to subscriber devices, such as subscriber devices 204-1, 204-2, may be manually entered by a user into a media show processing device. Subsequently, whenever the subscriber device subsequently connects to the media show processing device, the subscriber device properties can be checked to assist in determining the appropriate media file(s) to be scheduled for the given subscriber device during a media show.

Consistent with the present embodiments, based upon media file properties, subscriber device properties, or a combination of the two, among other factors, an enhanced media show may be prepared and/or orchestrated. In further embodiments, the preparation and/or orchestration of an enhanced media show may take account of display and other device properties of a media show processing device itself when such device is to be used to present media files in the enhanced media show. In particular, in various embodiments, an "intelligent" engine, such as a media management module of a media show processing device, may orchestrate the presentation of multiple media files in multiple devices, such that the media show provides a more engaging and immersive experience than that provided by a conventional slideshow presented in a single display device. The intelligent orchestration involved in managing of a media show may include determining, among other issues, which media file(s) to allocate for presentation on a given display or set of displays; when the presentation of a media file is to take place; the duration of presentation of a media file; and what part of a media file to be displayed, e.g., only an ROI, or an entire image of a media file.

In some embodiments, the timing of the presentation of media files may be based on the content of a media file(s). For example, a photograph that includes multiple persons may be presented for a longer duration than a photograph of a single person. In another example, a scenery photograph may serve as a "backdrop" to be presented for a relatively longer duration on a large display device, while a series of photographs and/or videos are each displayed for a relatively shorter duration on a small display device.

In further embodiments, timing of presentation of a media file may be based on display size of the subscriber device, and may additionally be based upon the display size of a media show processing device when one or more media files are to be presented on the media show processing device itself. For example, a photograph with intricate details may be shown for longer on a smaller display.

In still further embodiments, the timing of presentation of media files may be based on a user-selected soundtrack. In this approach, a media show processing system may synchronize the appearance and transition of media files according to an index file that describes attributes of the soundtrack.

Figure 9:
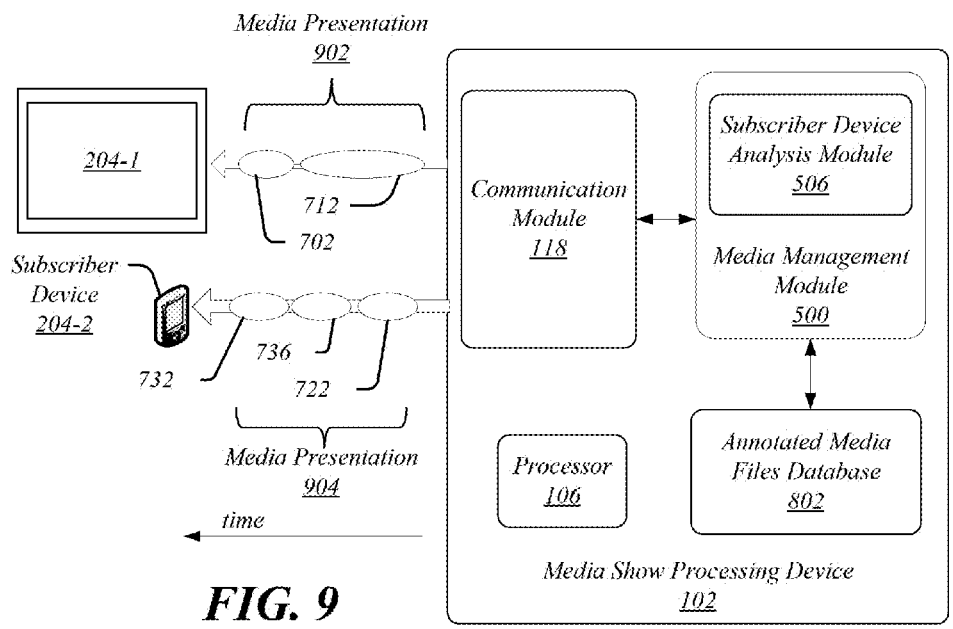
FIG. 9 depicts a use scenario consistent with the present embodiments.

FIG. 9 depicts one example of intelligent orchestration of a media show consistent with various embodiments. At the time a media show is to be launched, the subscriber devices 204-1, 204-2, as well as other devices (not shown) may be linked to the media show processing device 102. As preparation for the media show, a user may select a group of files to be executed (run) in the media show, for example, a group of media files in a folder that is related to a particular theme, such as the user's vacation. In one example, the media files may include annotated media files from an annotated media files database 802. The annotated media files may include information generated by a media management module 500 as detailed above with respect to FIGS. 5-7.

A subscriber device analysis module 506 may retrieve device properties of one or more subscriber devices to be scheduled to run the various media files that constitute the media show and match each subscriber device to one or more media files. For example, a media file containing a scenery image may be matched to a subscriber device having a large screen, a audio-containing file may be matched to a target subscriber device having external speakers, and so forth. Accordingly, when a user launches a media show, by, for example, engaging a "play" icon or button on the media show processing device 502, the various media files to be run may be allocated and sent to the appropriate target subscriber device.

Referring again to FIGS. 7a-7d, the images 702-732 may be sent to the target subscriber devices as image files as illustrated in FIG. 9. In the scenario depicted in FIG. 9, a media show may comprise the media presentation 902, which is scheduled in the subscriber device 204-1, together with the media presentation 904, which is scheduled in the subscriber device 204-2. The media presentation 902, in turn, comprises a sequential presentation of the images 702, 712. Thus, in the media presentation 902, the subscriber device 204-1, which contains a large display screen, initially presents a macro image of a flower as captured in image 712, followed by a panoramic view of a canyon, as captured by the image 702. In particular, the media management module 500 may schedule the media file containing image 702 because the annotation data 704 associated with image 702 indicates that the preferred display size is greater than 20 inches, which may apply to the subscriber device 204-1. In this manner, the display device 204-1 may present a large image of the panoramic canyon view of image 712 while other images are displayed on other display devices.

In the particular example shown in FIG. 9, the media presentation 904 sent to the subscriber device 204-2 comprises a sequential presentation of images 722, 736, and 732. Thus, the media presentation 904 presents an initial image 722 that depicts three persons against a scenic backdrop that may be related to the image presented in image 702. This may be followed presentation of an image from the ROI 1 736, which presents a close-up image of the persons in the image 702. Finally, the image 732, which is a head shot of one of the persons in the image 702, is presented.

Consistent with various embodiments, and as noted above, the timing of the presentation in each subscriber device of the images of a media presentation may be adjusted according to device properties and/or information associated with one or more images, such as the meta-data contained in an image file. Timing factors may include the instance in time when an image is first displayed and the duration for displaying an image.

Thus, for example, the start time and duration of presentation of each of images 702-732 in the media presentations 902 and 904 may be scheduled according to information contained in annotation data, 704, 714, 724, and/or 734, as well as device information of subscriber devices 204-1, 204-2. As suggested in FIG. 9, the media presentations 902 and 904 may overlap in time, while the image 712, which presents a panoramic scene, is presented for a relatively longer duration than the images 702, 722, 732, and 736, which present more intimate images.

In some embodiments, the timing of presentation of media files in a media show may be updated "on-the-fly" if display devices are subscribed/unsubscribed during the media show. Thus, for example, if the subscriber device 204-1 unsubscribes or is disconnected from the media show processing device 102 during a media show, that is, no longer links to the media show processing device 102 for the purposes of receiving media files of the media show, the media show processing device 102 may re-allocate the image 702 for presentation in another subscriber device or may drop the presentation of the image 702.

In various other embodiments, a soundtrack may be provided as part of a media show. For example, a user may choose a selection of a soundtrack for a media show that contains multiple slideshow-type media presentations. In order to choreograph transitions between the display different images so that the transitions match the soundtrack, the selected soundtrack may be analyzed by a media show processing system. For example, a media management module 500 may analyze the selected soundtrack to extract the musical beat, to identify key transitions in audio, and/or to distinguish between different instruments that may be performing in the soundtrack. In some embodiments, the media management module 500 may generate an index file that describes these features of the soundtrack. The index file may subsequently be used by the media show processing device 102 during a media show to provide timing of delivery and transition between display of different media files on different devices, so that the visual display of images may coincide with select features of the soundtrack.

In accordance with additional embodiments, an index file for an audio soundtrack to be run concurrently with visual content of a media show may be provided to a media show processing system by an external source. For example, a soundtrack that includes an index file may be purchased and downloaded to the media show processing device from an online store.

In still further embodiments, the timing and transition between display of media file content in a media show may be automatically selected based on the purpose of the media show, or the desired experience. This feature may be referred to as a media show "theme." In one example, if an "Ambient" theme is selected for a media show that includes a set of photographs and/or videos, the set of photographs/videos may be presented in a non-disrupting fashion so that the user may engage in other activities without being unduly disrupted.

Although the aforementioned embodiments have detailed various scenarios in which media content is provided to subscriber devices from a media show processing device that is local to the subscriber devices, such as a user's personal computer, in further embodiments, media content may be provided to subscriber devices from a remote source, such as the Internet. In one example, the media show processing device may link to and direct one or more subscriber devices to access a website that provides media content, such as one or more videos and/or photographs.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
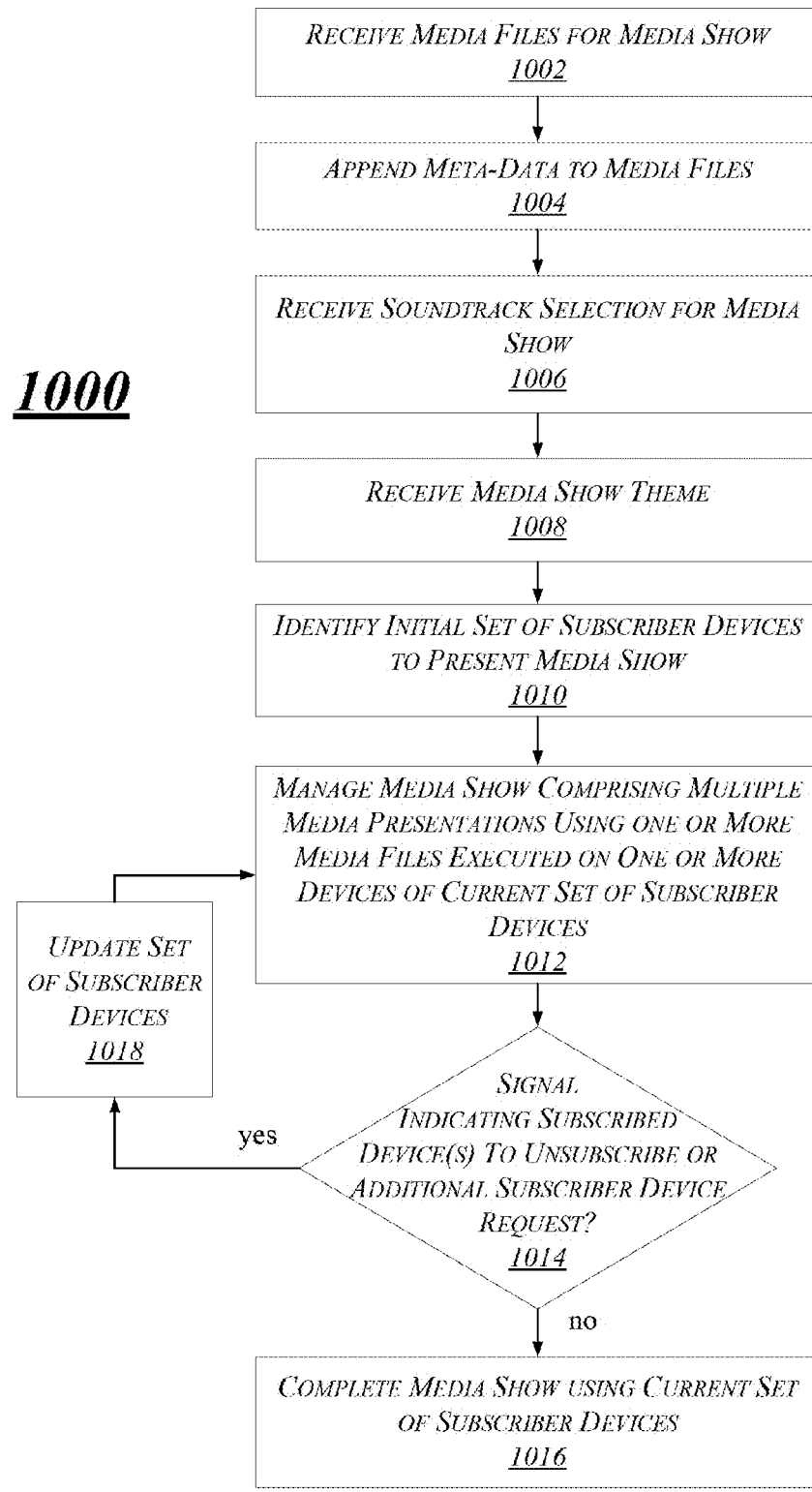
FIG. 10 presents an exemplary first logic flow.

FIG. 10 illustrates an exemplary logic flow 1000. At block 1002, one or more media files is received for a media show. The media files may be stored, for example, in a media show processing device that is to manage the media show. At block 1004, meta-data is appended to one or more of the media files. The meta-data may be appended in various ways, including: by manual entry from a user; by automatic operation of a device that generated a media file, such as a camera; by downloading user evaluation received from an external source, such as an Internet website; by operation of a computer vision technique that evaluates the given media file.

At block 1006, a soundtrack is received for the media show. In one example, the soundtrack may be received and stored together with an index in the media show processing device. At block 1008, a media show theme is received corresponding to a media show to be presented. At block 1010, an initial set of subscriber devices to present the media show is identified. For example, the media show processing device to present the media show may communicatively link to one or more devices, resulting in the devices becoming subscriber devices for the purposes of the media show to be presented. A user of the media show processing device to present the media show may perform the subscribing of devices based upon available display devices that may be linked to the media show processing device, such as over a local wireless network.

At block 1012, a media show comprising multiple media presentations is managed. The media show may include one or more media files that are executed on one or more device of a current set of subscriber devices.

At block 1014, if no signal is received indicating that a currently subscribed device is to unsubscribe or a new device is to subscribe to the media show, the flow moves to block 1016. At block 1016, the media show is completed using a current set of subscribed devices.

If, at block 1014, a signal is received indicating that a currently subscribed device is to unsubscribe or a new device is to subscribe to the media show, the flow moves to block 1018. At block 1018 the set of subscriber devices is updated and the flow returns to block 1014.

Figure 11:
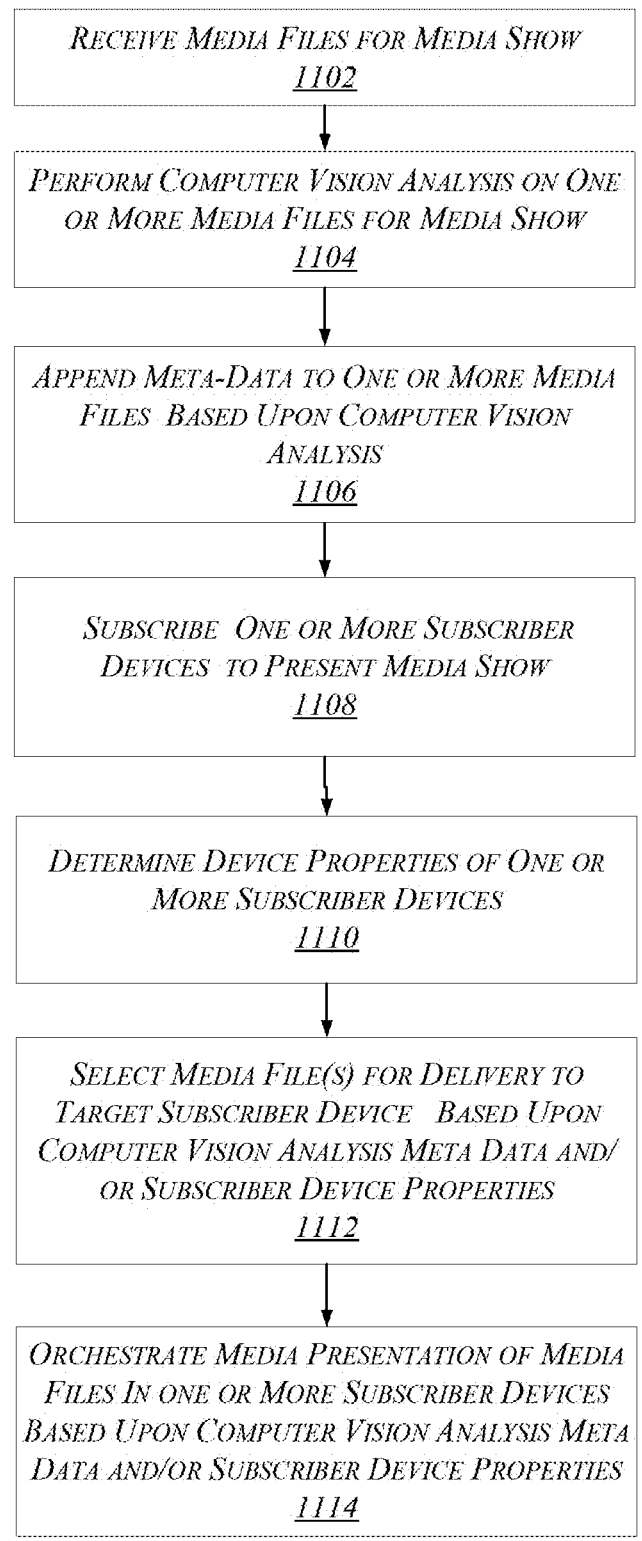
FIG. 11 presents an exemplary second logic flow.

FIG. 11 illustrates another exemplary logic flow 1100. At block 1102, one or more media files is received for a media show.

At block 1104, computer vision analysis is performed on the one or more received media files. At block 1106, meta-data is appended to the one or more media files based upon the results of the computer vision analysis. The computer vision analysis may generate meta-data including detection of persons, faces, animals, and other objects, and may denote regions of interest within an image.

At block 1108, one or more devices to collectively present a media show are subscribed to a media show processing device that is to orchestrate the media show.

At block 1110 device properties of the one or more subscribed devices is determined. The device properties may include size of a display in the subscribed device, sound capability, whether the subscribed device can present stereo images, and other features.

At block 1112, one or more media file(s) are selected for delivery to a target subscriber device based upon computer vision analysis meta-data and/or determined subscriber device properties. This process may be repeated for multiple target subscriber devices.

At block 1114, a media presentation of media files is orchestrated in each of one or more subscriber devices based upon the computer vision analysis data acquired for the one or more media files and/or the determined subscriber device properties. The orchestration of a media presentation may involve the determination of the set of media files to be delivered to a subscriber device to constitute a given media presentation, as well as the order of their delivery, the timing of the presentation of each media file, such as the start time and the duration of presentation, and so forth.

Figure 12:
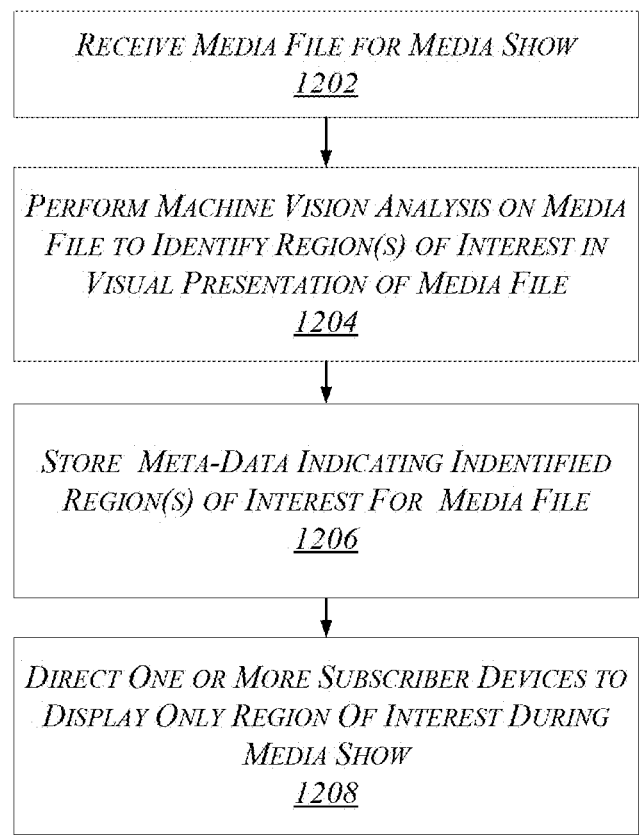
FIG. 12 presents an exemplary third logic flow.

FIG. 12 depicts another exemplary logic flow 1200. At block 1202, a media file is received for a media show. At block 1204, machine vision analysis is performed on the media file to identify a region(s) of interest in a visual presentation, such as an image generated by the media file. At block 1206, meta-data indicating the identified region(s) of interest is stored. At block 1208, one or more subscriber devices is directed to display only the identified region of interest during a media show.

Figure 13:
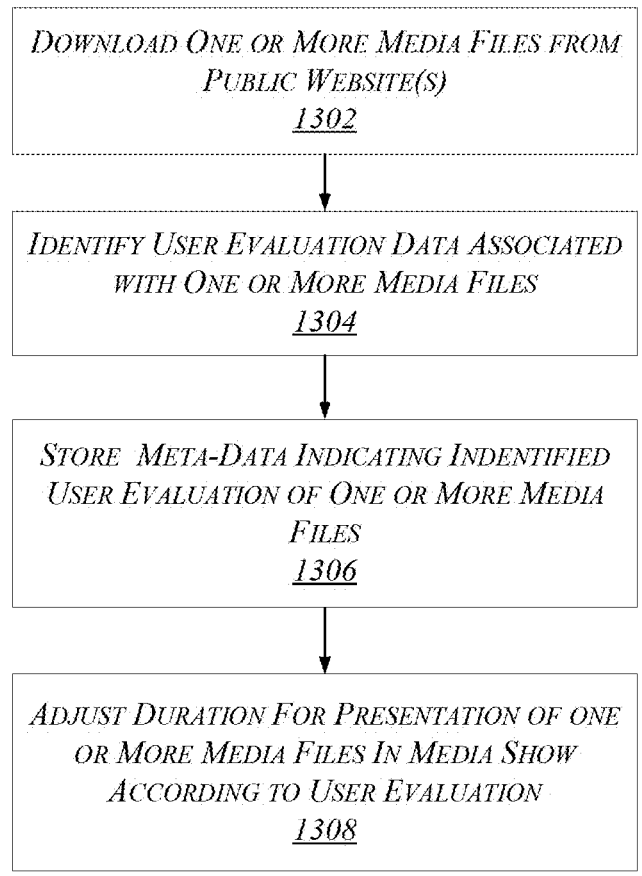
FIG. 13 presents an exemplary fourth logic flow.

FIG. 13 depicts a further exemplary logic flow 1300. At block 1302, one or more media files is downloaded from a public website. At block 1304, user evaluation data associated with the one or more media files is identified. At block 1306, the user evaluation data is stored as meta-data that indicates the identified user evaluation of the one or downloaded more media files. At block 1308, the duration of presentation of the one or more media files in a media show to be presented is adjusted according to the user evaluation meta-data.

Figure 14:
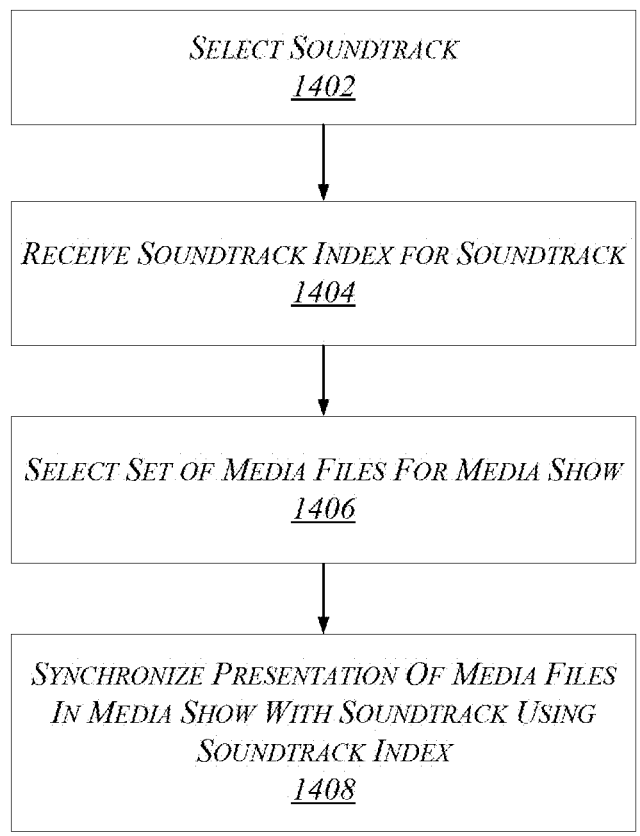
FIG. 14 presents an exemplary fifth logic flow.

FIG. 14 presents another exemplary logic flow 1400. At block 1402 a soundtrack is selected. At block 1404 a soundtrack index for the soundtrack is received. At block 1406, a set of media files is selected for a media show. In particular, the media files may present still images or video content. In one example, the set of media files is used by a media show processing system as a source of media files to be allocated to multiple devices including subscriber device(s) for presentation during the media show. At block 1408, using the soundtrack index, the soundtrack is synchronized for playing together with the presentation(s) of media files in one or more device that includes media files containing visual content.

Figure 15:
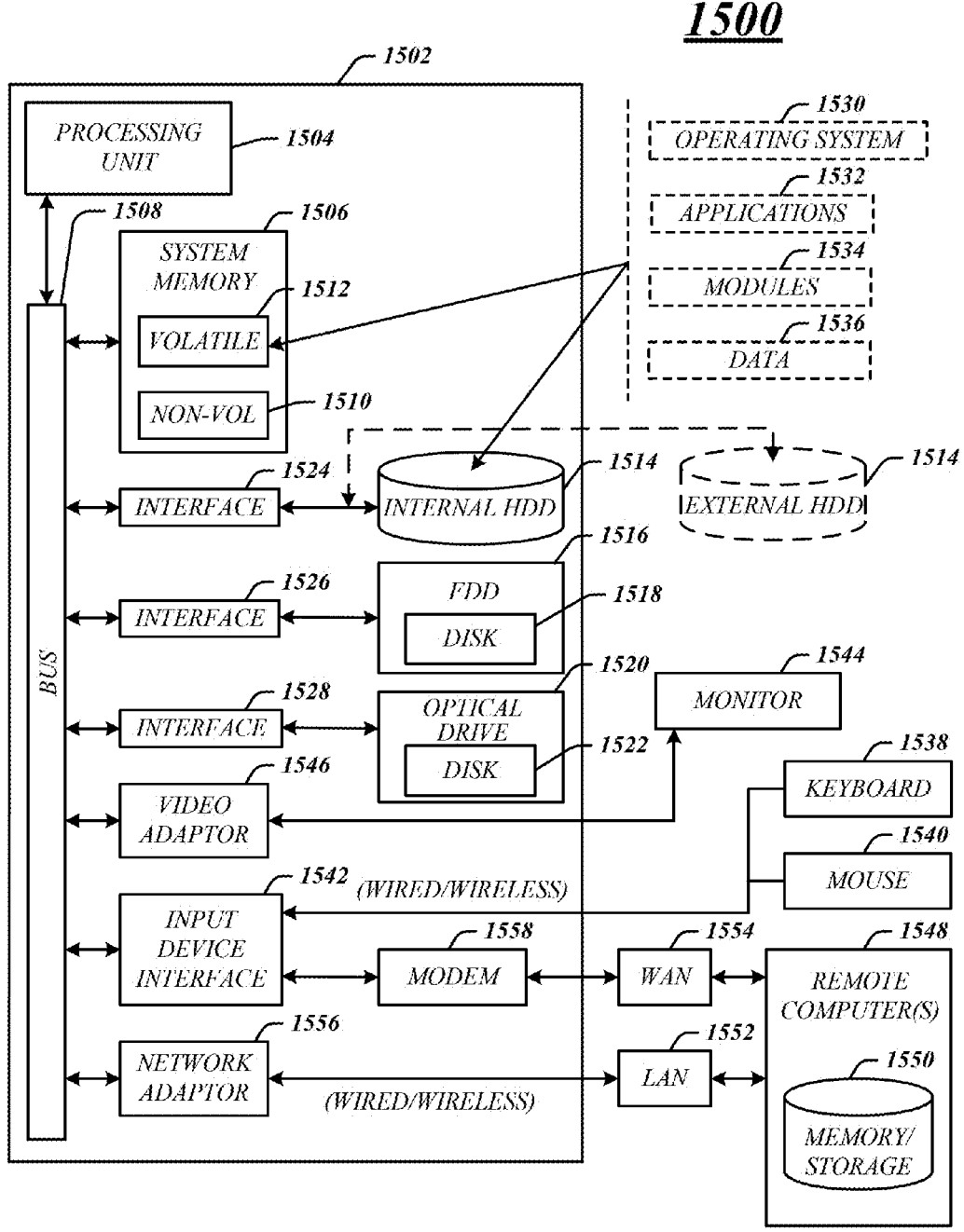
FIG. 15 is a diagram of an exemplary system embodiment.

FIG. 15 illustrates an embodiment of an exemplary computing architecture 1500 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1500 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1500 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1500.

As shown in FIG. 15, the computing architecture 1500 comprises a processing unit 1504, a system memory 1506 and a system bus 1508. The processing unit 1504 can be any of various commercially available processors. Dual microprocessors and other multi-processor architectures may also be employed as the processing unit 1504. The system bus 1508 provides an interface for system components including, but not limited to, the system memory 1506 to the processing unit 1504. The system bus 1508 can be any of several types of bus structure that may further interconnect to a memory bus (with or without a memory controller), a peripheral bus, and a local bus using any of a variety of commercially available bus architectures.

The computing architecture 1500 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 15, the system memory 1506 can include non-volatile memory 1510 and/or volatile memory 1512. A basic input/output system (BIOS) can be stored in the non-volatile memory 1510.

The computer 1502 may include various types of computer-readable storage media in the form of one or more lower speed memory units, including an internal hard disk drive (HDD) 1514, a magnetic floppy disk drive (FDD) 1516 to read from or write to a removable magnetic disk 1518, and an optical disk drive 1520 to read from or write to a removable optical disk 1522 (e.g., a CD-ROM or DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536.

A user can enter commands and information into the computer 1502 through one or more wire/wireless input devices, for example, a keyboard 1538 and a pointing device, such as a mouse 1540. Other input devices may include a microphone, an infra-red (IR) remote control, a joystick, a game pad, a stylus pen, touch screen, or the like. These and other input devices are often connected to the processing unit 1504 through an input device interface 1542 that is coupled to the system bus 1508, but can be connected by other interfaces such as a parallel port, IEEE 1394 serial port, a game port, a USB port, an IR interface, and so forth.

A monitor 1544 or other type of display device is also connected to the system bus 1508 via an interface, such as a video adaptor 1546. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 856.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In one embodiment, an apparatus may include a memory to store a multiplicity of media files to be run in a media show, the media show comprising a multiplicity of media presentations to be concurrently performed in two or more devices including one or more subscriber devices. The apparatus may also include a processor circuit, and a media management module operable on the processor circuit to identify meta-data from one or more media files of the multiplicity of media files, and to allocate, based upon the meta-data, a first set of media files of the multiplicity of media files for a first media presentation and a second set of media files of the multiplicity of media files for a second media presentation.

In another embodiment the media management module may be operable on the processor circuit to identify device property information of one or more subscriber devices to be used to output content of a respective set of media files.

Alternatively, or in addition, the apparatus may comprise a digital display to present the first or the second media presentation.

Alternatively, or in addition, the media management module may be operable on the processor circuit to perform computer vision analysis of a still image or video generated by a media file.

Alternatively, or in addition, the media management module may be operable on the processor circuit to extract file information from one or more media files including one or more of: meta-data previously embedded in a media file; user-entered metadata; machine analysis of content in the media file; and recorded on-line user interaction with the media file.

Alternatively, or in addition, the media management module may be operable on the processor circuit to identify a region of interest (ROI) in a still image or video generated by execution of a media file, to annotate the media file with a tag that denotes the ROI, and to schedule an ROI for display during a media presentation based upon the annotated ROI.

Alternatively, or in addition, the media management module may be operable to determine timing of one or more media presentations of the multiplicity of media presentations based upon one or more of: the determined meta-data and device property information of one or more subscriber devices to be used to output content of the respective one or more media files.

Alternatively, or in addition, the media management module may be operable on the processor circuit to identify a user theme selection, and to schedule timing of the multiplicity of media presentations based upon the user theme.

Alternatively, or in addition, the media management module may be operable on the processor circuit to select a soundtrack for running during the running of the multiplicity of media presentations and to schedule timing of the multiplicity of media presentations based upon the selected soundtrack.

Alternatively, or in addition, the media management module may be operable on the processor circuit to schedule timing of at least one media presentation based upon content of one or more media presentations.

Alternatively, or in addition, the media management module may be operable on the processor circuit to receive user evaluation of one or more media files to be presented in the media show; and schedule timing of the multiplicity of media presentations based upon the user evaluation.

In a further embodiment, a method may include identifying meta-data in one or more media files of a multiplicity of media files for presentation in a media show; the media show comprising a multiplicity of media presentations to be concurrently performed in two or more devices including the one or more subscriber devices. The method may further include identifying device information received from one or more subscriber devices, and allocating, based upon the meta-data, a first set of media files of the multiplicity of media files for a first media presentation and a second set of media files of the multiplicity of media files for a second presentation.

In another embodiment, the method may comprise extracting file information from one or more media files based upon one or more of: meta-data previously embedded in a media file; user-entered metadata; machine analysis of content in the media file; and recorded on-line user interaction with the media file.

Alternatively, or in addition, the method may comprise determining display properties of one or more displays to present respective one or more media presentations of the multiplicity of media presentations, and scheduling the multiplicity of media presentations based upon the determined display properties.

Alternatively, or in addition, the method may comprise identifying a region of interest (ROI) in a still image or video generated by execution of a media file, annotating the media file with a tag that denotes the ROI and scheduling an ROI for display during a media presentation based upon the annotated ROI.

Alternatively, or in addition, the method may comprise identifying a user theme selection and scheduling timing of the multiplicity of media presentations based upon the user theme.

Alternatively, or in addition, the method may comprise selecting a soundtrack for running during the running of the multiplicity of media presentations and scheduling timing of the multiplicity of media presentations based upon the selected soundtrack.

Alternatively, or in addition, the method may comprise receiving user evaluation of one or more media files to be presented in the media show and scheduling timing of the multiplicity of media presentations based upon the user evaluation.

In a further embodiment, an apparatus may be configured to perform the method of any one of the preceding embodiments.

In another embodiment, at least one machine readable medium may comprise a plurality of instructions that in response to being executed on a computing device, cause the computing device to carry out a method according to any one of the preceding embodiments.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a processor circuit; and
a media management module operative on the processor circuit to:
identify meta-data from one or more of a plurality of media files and to allocate, based on the meta-data, one or more media files for a first media presentation of a media show on a first device and one or more different media files for a second media presentation of the media show on a second device different than the first device, at least a portion of each of the first and second media presentations to occur at least partly concurrently with a single presentation of a soundtrack; and
cooperate with the first and second devices to synchronize occurrences of at least a first transition in the first media presentation by the first device and of at least a second transition in the second media presentation by the second device to at least one feature of the soundtrack during the single presentation of the soundtrack.

2. The apparatus of claim 1, the media management module operable on the processor circuit to identify device property information of one or more subscriber devices to be used to output content of the respective one or more media files, the one or more subscriber devices comprising at least one of the first device and the second device.

3. The apparatus of claim 2, comprising:
a wireless radio communicatively coupled to the processor circuit and arranged to communicate with one or more subscriber devices over a local wireless network; and
a memory to store at least one of the plurality of media files.

4. The apparatus of claim 1, the media management module operable on the processor circuit to perform computer vision analysis of a still image or video generated by a media file.

5. The apparatus of claim 4, the media management module operable on the processor circuit to extract file information from one or more media files including one or more of:
meta-data previously embedded in a media file;
user-entered metadata;
machine analysis of content in the media file; and
recorded on-line user interaction with the media file.

6. The apparatus of claim 1, the media management module operable on the processor circuit to:
identify a region of interest (ROI) in a still image or video generated by execution of a media file; and
annotate the media file with a tag that denotes the ROI.

7. The apparatus of claim 6, the media management module operable on the processor circuit to schedule an ROI for display during the first media presentation and not the second media presentation based upon the annotated ROI.

8. The apparatus of claim 1, the media management module operable on the processor circuit to:
determine timing of at least one of the first and second media presentations based upon one or more of:
the determined meta-data and device property information of one or more subscriber devices to be used to output content of respective one or more media files, the one or more subscriber devices comprising at least one of the first device and the second device.

9. The apparatus of claim 1, the media management module operable on the processor circuit to:
identify a user theme selection; and
schedule timing of at least one of the first and second media presentations based upon the user theme.

10. The apparatus of claim 1, the media management module operable on the processor circuit to:
select the soundtrack, the at least one feature of the soundtrack comprising at least one of a musical beat extracted by the media management module, a transition in the soundtrack identified by the media management module or a an instrument in the soundtrack distinguished from other instruments by the media management module; and
schedule timing of the first and second media presentations based upon the selected soundtrack.

11. The apparatus of claim 1, the media management module operable on the processor circuit to:
receive user evaluation of one or more media files to be presented in at least one of the first and second media presentations; and
schedule timing of at least one of the first and second media presentations based upon the user evaluation.

12. At least one computer-readable storage medium comprising instructions that, when executed, cause a system to:
identify meta-data from one or more of a plurality of media files;
allocate, based on the meta-data, one or more media files for a first media presentation of a media show on a first device and one or more different media files for a second media presentation of the media show on a second device different than the first device, at least a portion of each of the first and second media presentations to occur at least partly concurrently with a single presentation of a soundtrack; and
cooperate with the first and second devices to synchronize occurrences of at least a first transition in the first media presentation by the first device and of at least a second transition in the second media presentation by the second device to at least one feature of the soundtrack during the single presentation of the soundtrack.

13. The at least one computer-readable storage medium of claim 12 comprising instructions that, when executed, cause a system to:
identify device property information received from one or more subscriber devices, the one or more subscriber devices comprising at least one of the first device and the second device; and
allocate, based upon the identified device property information, the one or more media files for the first media presentation and the one or more different media files for the second media presentation.

14. The at least one computer-readable storage medium of claim 12, comprising instructions that, when executed, cause a system to schedule signals for each of the first and second media presentations to be forwarded over a local wireless network.

15. The at least one computer-readable storage medium of claim 12, comprising instructions that, when executed, cause a system to extract file information from one or more media files including one or more of:
meta-data previously embedded in a media file;
user-entered metadata;
machine analysis of content in the media file; and
recorded on-line user interaction with the media file.

16. The at least one computer readable medium of claim 15, comprising instructions that, when executed, cause a system to perform the machine analysis by performing computer vision analysis of a still image or video generated by a media file.

17. The at least one computer readable medium of claim 12, comprising instructions that, when executed, cause a system to:
identify a region of interest (ROI) in a still image or video generated by execution of a media file; and
annotate the media file with a tag that denotes the ROI.

18. The at least one computer readable medium of claim 17, comprising instructions that, when executed, cause a system to schedule an ROI for display during the first media presentation and not the second media presentation based upon the annotated ROI.

19. The at least one computer-readable storage medium of claim 12, comprising instructions that, when executed, cause a system to:
determine timing of one or more of the first and second media presentations based upon one or more of:
the determined meta-data and the determined device property information.

20. The at least one computer-readable storage medium of claim 12, comprising instructions that, when executed, cause a system to:
- select the soundtrack, the at least one feature of the soundtrack comprising at least one of a musical beat extracted by the media management module, a transition in the soundtrack identified by the media management module or a an instrument in the soundtrack distinguished from other instruments by the media management module; and
- schedule timing of the of the first and second media presentations based upon the selected soundtrack.

21. The at least one computer-readable storage medium of claim 12, comprising instructions that, when executed, cause a system to:
- receive user evaluation of one or more media files to be presented in at least one of the first and second media presentations; and
- schedule timing of the at least one of the first and second media presentations based upon the user evaluation.

22. A method, comprising:
- identifying meta-data from one or more of a plurality of media files;
- identifying device information received from a first and a second subscriber device to output a first and a second media presentation, respectively;
- allocating, based on the meta-data and the device information, one or more media files for the first media presentation of a media show on the first subscriber device and one or more different media files for the second media presentation of the media show on the second subscriber device, at least a portion of each of the first and second media presentations to occur at least partly concurrently with a single presentation of a soundtrack; and
- cooperating with the first and second subscriber devices to synchronize occurrences of at least a first transition in the first media presentation by the first subscriber device and of at least a second transition in the second media presentation by the second subscriber device to at least one feature of the soundtrack during the single presentation of the soundtrack.

23. The method of claim 22, comprising extracting file information from one or more media files based upon one or more of:
- meta-data previously embedded in a media file;
- user-entered metadata;
- machine analysis of content in the media file; and
- recorded on-line user interaction with the media file.

24. The method of claim 22, comprising:
- determining display properties of one or more of the first and second subscriber device; and
- scheduling one or more of the first and second media presentations based upon the determined display properties.

25. The method of claim 22, comprising:
- identifying a region of interest (ROI) in a still image or video generated by execution of a media file;
- annotating the media file with a tag that denotes the ROI; and
- scheduling an ROI for display during the first media presentation and not the second media presentation based upon the annotated ROI.

26. The method of claim 22, comprising:
- identifying a user theme selection; and
- scheduling timing of at least one of the first and second media presentations based upon the user theme.

27. The method of claim 22, comprising:
- selecting the soundtrack, the at least one feature of the soundtrack comprising at least one of a musical beat extracted by the media management module, a transition in the soundtrack identified by the media management module or a an instrument in the soundtrack distinguished from other instruments by the media management module; and
- scheduling timing of the first and second media presentations based upon the selected soundtrack.

28. The method of claim 22, comprising:
- receiving user evaluation of one or more media files to be presented in at least one of the first and second media presentations; and
- scheduling timing of at least one of the first and second media presentations based upon the user evaluation.

* * * * *